US010548073B1

(12) United States Patent
Shirahatti (10) Patent No.: US 10,548,073 B1
(45) Date of Patent: Jan. 28, 2020

(54) DYNAMIC AGGRESSOR FIELD CALIBRATION

(71) Applicant: APPLE INC., Cupertino, CA (US)

(72) Inventor: Harsha Shirahatti, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/141,538

(22) Filed: Sep. 25, 2018

(51) Int. Cl.
*H04W 48/18* (2009.01)
*H04W 24/02* (2009.01)
*H04W 88/06* (2009.01)

(52) U.S. Cl.
CPC .......... *H04W 48/18* (2013.01); *H04W 24/02* (2013.01); *H04W 88/06* (2013.01)

(58) Field of Classification Search
CPC ... H04W 16/14; H04W 24/02; H04W 72/082; H04W 24/10; H04W 4/021; H04W 88/06; H04W 24/00; H04W 16/10; H04W 24/08; H04W 28/0236; H04W 28/085; H04W 72/085; H04W 36/0083; H04W 4/023; H04W 4/027; H04W 52/243; H04W 52/244; H04W 52/245; H04W 52/247; H04W 64/00; H04W 72/00; H04W 72/042; H04W 74/00; H04W 74/0816; H04W 74/0833; H04W 28/0231; H04W 36/00837; H04W 36/165; H04W 36/20; H04W 36/30; H04W 4/022; H04W 4/029; H04W 64/003; H04W 72/048; H04W 72/1215; H04W 84/06; H04W 48/18
See application file for complete search history.

(56) References Cited

U.S. PATENT DOCUMENTS

| | | | |
|---|---|---|---|
| 2003/0054814 A1* | 3/2003 | Karabinis | H04B 7/18563 455/427 |
| 2012/0178386 A1* | 7/2012 | Pascolini | H04B 1/525 455/84 |
| 2012/0281563 A1* | 11/2012 | Comsa | H04W 24/10 370/252 |

* cited by examiner

*Primary Examiner* — Daniel Lai
(74) *Attorney, Agent, or Firm* — Fay Kaplun & Marcin, LLP (57) ABSTRACT

A device is configured to receive signals from a first network and one of transmit signals to or receive signals from a second network. The device is further configured to determine whether at least one parameter related to the first network satisfies a predetermined condition, when the at least one parameter satisfies the predetermined condition, monitoring a degradation of signals received from the first network when an aggressor of the second network is present relative to signals received from the first network when the aggressor is absent and determining a setting to subsequently utilize the first network when the aggressor is present based, at least in part, on the degradation.

20 Claims, 4 Drawing Sheets

DYNAMIC AGGRESSOR FIELD CALIBRATION

BACKGROUND INFORMATION

A user equipment (UE) may be configured to establish a connection to at least one of a plurality of different networks or types of networks to perform a variety of different functionalities via the connection. For example, the UE may connect to a first type of network (e.g., Long Term Evolution (LTE) network) to communicate with another UE via the network (e.g., a user of the UE may perform a voice call or transmit text to another user of another UE). In another example, the UE may receive signals from a Global Navigation Satellite System (GNSS) to utilize global positioning applications.

When the UE is capable of simultaneously using a plurality of different networks through respective frequencies, the UE may experience interference. For example, the UE may be connected to the LTE network to access webpages on a browser application executed on the UE. At the same time, the UE may also be receiving signals from the GNSS network to provide navigation or other location related services, e.g., at the UE. As those skilled in the art will understand, the LTE network may utilize a first set of frequencies while the GNSS network may utilize a second set of frequencies. The LTE frequencies may include one or more frequencies that interfere with one or more frequencies of the GNSS frequencies. For example, an LTE frequency that is within a range of a GNSS frequency may create interference by reducing signal quality for the GNSS signals. Such frequencies that create this interference may be referred to as aggressors.

To address scenarios in which aggressors impact a signal quality of received and/or transmitted signals, the UE may be configured with predetermined settings based on a table. The table may be generated using lab results from testing one or more UEs that have not yet been deployed. Accordingly, by selecting UEs after being manufactured and prior to delivery for use, the selected UEs may be tested with respect to various parameters and interference conditions. Based on the results of the testing, a worst case scenario for each interference condition is selected to populate the table. The table may then be used to select an appropriate mitigation mechanism that imparts settings to be used to tune for the worst case. However, UEs may differ and the worst case scenario for a given interference scenario may not be required for a particular UE. Therefore, while a table populated with worst case scenarios and corresponding mitigation mechanisms may provide a blanket approach for all UEs of a given type, the table may not be matched with the individual operating parameters of a specific UE.

SUMMARY

An exemplary embodiment describes a method performed by a device configured to receive signals from a first network and one of transmit signals to or receive signals from a second network. The method includes determining whether at least one parameter related to the first network satisfies a predetermined condition, when the at least one parameter satisfies the predetermined condition, monitoring a degradation of signals received from the first network when an aggressor of the second network is present relative to signals received from the first network when the aggressor is absent and determining a setting to subsequently utilize the first network when the aggressor is present based, at least in part, on the degradation.

A further exemplary embodiment describes a device having a transceiver and a processor. The transceiver is configured to receive signals from a first network and one of receive signals from or transmit signals to a second network. The processor is configured to determine whether at least one parameter related to the first network satisfies a predetermined condition, when the at least one parameter satisfies the predetermined condition, the processor monitoring a degradation of signals received from the first network when an aggressor of the second network is present relative to signals received from the first network when the aggressor is absent. The processor is further configured to determine a setting to subsequently utilize the first network when the aggressor is present based, at least in part, on the degradation.

In a still further exemplary embodiment, a further method is performed by a device configured to receive signals from a first network and one of transmit signals to or receive signals from a second network. The method includes determining whether at least one parameter related to the first network satisfies a predetermined condition, when the at least one parameter satisfies the predetermined condition, monitoring a first degradation of signals received from the first network when a first aggressor of the second network is present relative to signals received from the first network when the first aggressor is absent and determining a setting to subsequently utilize the first network when a second aggressor is present using a bias based on the first degradation that is applied to a second degradation of the second aggressor.

DETAILED DESCRIPTION

The exemplary embodiments may be further understood with reference to the following description and the related appended drawings, wherein like elements are provided with the same reference numerals. The exemplary embodiments are related to devices, systems, and methods for dynamically calibrating a user equipment (UE) to compensate for an aggressor that creates interference for a signal quality associated with other signals. A network connection can be bi-directional (e.g., transmit and receive) or uni-directional (e.g., receive only, such as signals received from one or more Global Positioning System (GPS) satellites). The exemplary embodiments provide a mechanism that field tests the UE under appropriate conditions to monitor a signal degradation for signals received from a first network when the aggressor of a second network is present relative to signals received from the first network when the aggressor is absent. Results from the monitoring may be used to update a table that forms a basis to modify one or more settings to be used as a mitigation mechanism. The exemplary embodiments also provide a further mechanism that field tests the UE for an aggressor at a specific parameter, which forms the basis upon which to bias an entry in the table for a different parameter of the same type.

Initially, the exemplary embodiments are described with regard to simultaneous use of two networks. For example, a first network may be one or more Global Navigation Satellite System (GNSS) networks with an aggressor being from a second network that is a Long Term Evolution (LTE) network. However, the use of the GNSS network and the LTE network along with any corresponding frequencies upon which these networks operate is only exemplary. The exemplary embodiments may be modified to be implemented for use with any first network where a second network includes an aggressor and/or within the same network in which one frequency is an aggressor for another frequency. For example, the GPS network may be used in North America and the Galileo network may be understood to be used in Europe. A substantially similar type of network or counterpart used in a different continent may also be used by the exemplary embodiments, e.g., GLONASS, BeiDou, etc. Thus, the GNSS network may represent any satellite-based network or any combination of satellite-based networks. Further, one or more other radio navigation networks also may be used.

Because one of the networks is a GNSS network, the exemplary embodiments are also described with regard to satellites and corresponding operations (e.g., searching for satellites, identifying the satellites, determining a quality of the satellite's signals, etc.). However, the satellites as a component from which signals are exchanged (e.g., received) is only exemplary. The exemplary embodiments may be modified for other components with which signals are exchanged (e.g., base stations, access points, etc). The GNSS network is identified as a network, but may operate in a manner that is different than a conventional network. For example, a conventional network may be configured to exchange signals and data (e.g., transmit and receive) between two or more components (or nodes). However, the GNSS network may be configured such that satellites broadcast signals that are received by UEs such that information exchange occurs in a single direction. Thus, the GNSS is described as a network in a general manner in which more than one component is interconnected with another.

A UE may communicate (e.g., receive signals from and/or transmit signals to) with a plurality of different types of networks and may utilize these networks individually or in combination for respective applications and purposes. When a first signal is transmitted or received over a first wireless network, the signal may be interfered with by a second signal being transmitted or received over a second wireless network. For example, a signal received over a GNSS network may be interfered by an aggressor signal, such as a signal transmitted or received over an LTE network. The aggressor of the LTE network may interfere with the signals of the GNSS network at varying degrees, e.g., based on parameters of the aggressor. For example, for a GNSS network, LTE band 13 may be considered an aggressor. Thus, there may be different combinations of parameters of the signal being transmitted over the LTE network that may give rise to scenarios in which a quality of the GNSS network is impacted. The parameters of the signal(s) of the LTE network that acts as an aggressor to the GNSS network may include, for example, different combinations of resource blocks (RBs), a transmit power, etc. Accordingly, the signal quality may be decreased for the GNSS network such that applications and services using information provided by or derived from the GNSS signals may be negatively impacted.

Figure 1:
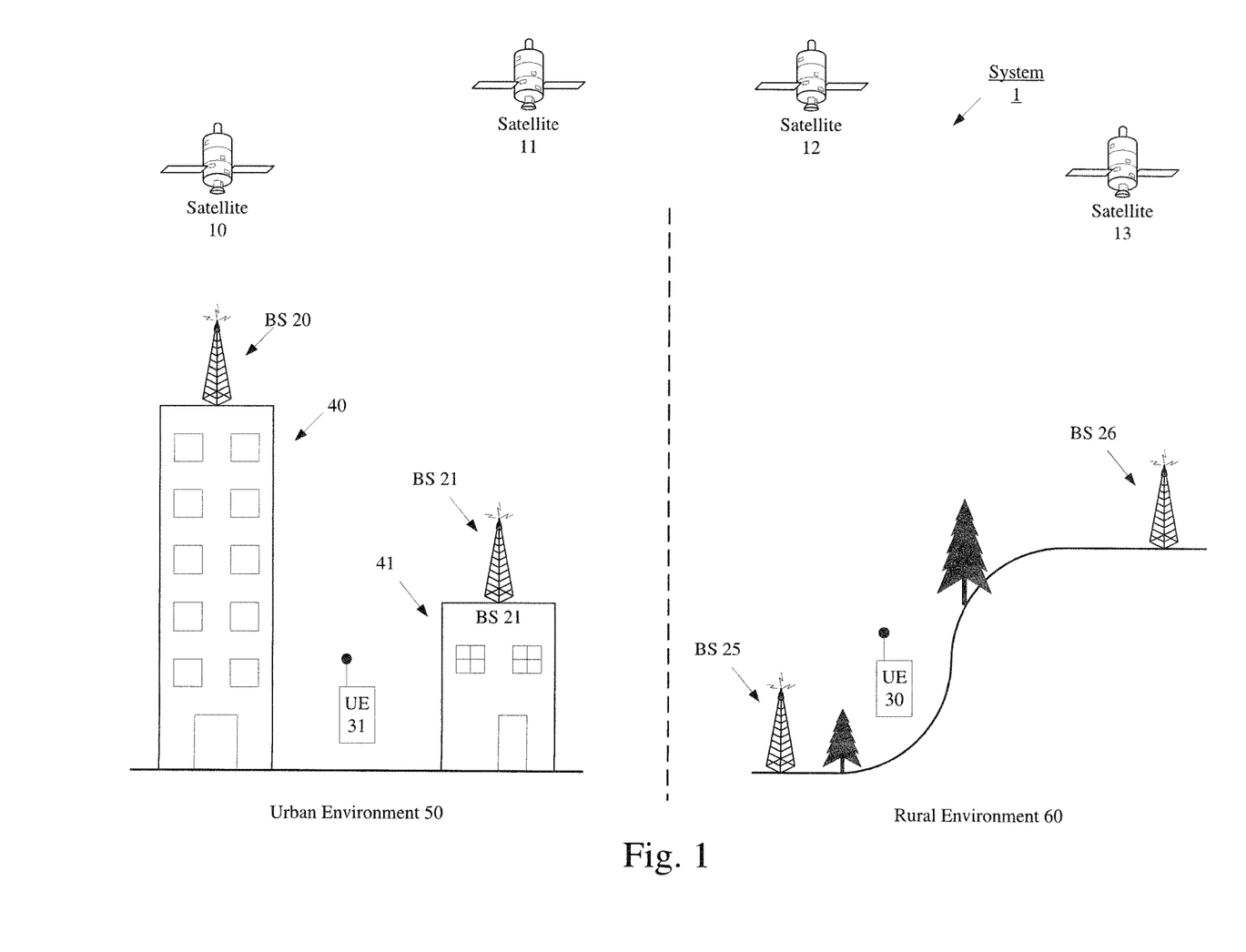
FIG. 1 shows an exemplary system comprising an exemplary GNSS network, an exemplary LTE network and user equipment that receive signals from and/or transmit signals to the exemplary networks.

FIG. 1 shows an exemplary system 1 comprising an exemplary GNSS network, an exemplary LTE network and user equipment that receive signals from and/or transmit signals to the exemplary networks. In this example, the GNSS network is represented by a series of satellites 10-13 that are arranged at different locations, typically in geosynchronous earth orbit. The LTE network is represented by a series of base stations 20, 21, 25 and 26. In this example, the base stations 20 and 21 are shown as being located in an urban environment 50, e.g., the base stations 20 and 21 are located on top of buildings 40 and 41, respectively. The base stations 25 and 26 are shown as being located in a rural environment 60, e.g., a location having little to no manmade structures. An exemplary UE is also located in each of the urban environment 50 (e.g., UE 31) and the rural environment (e.g., UE 30). It should be understood that the depiction in FIG. 1 is not to scale and is provided to illustrate various operating environments that a UE may experience and various networks that may transmit signals to and/or receive signals from the UEs 30 and 31.

As described above, when the UEs 30 and 31 are receiving signals from the GNSS network via one or more of the satellites 10-13, these GNSS network signals may be impacted by the UEs 30 and 31 connection to the LTE network, e.g., via one or more of the base stations 20, 21, 25 and 26. As will be described in greater detail below, the exemplary embodiments provide a device, system, and method of tuning a UE for traffic on a first network (e.g., signals received by the UEs from the GNSS network) by calibrating for one or more aggressors from a second network (e.g., signals from/to the LTE network).

The UEs 30 and 31 may be preloaded with one or more parameters and/or combinations of parameters (e.g., RB and transmit power) for use with the LTE network to compensate for scenarios in which the aggressor from the LTE network negatively impacts the GNSS network signals. The negative impact may be, for example, when the quality of the GNSS network signals fall below a predetermined threshold as measured by, for example, a carrier to noise density ratio. In some implementations, the parameters/combinations of parameters may be stored in a table. Each of the parameters/combinations may have an associated mitigation scheme that attempts to calibrate the UE so that the impact of the interference by the aggressor from the LTE network is reduced or minimized with respect to the GNSS network signals. For example, there may be no mitigation strategy implemented for a parameter/combination of parameters of an aggressor of the LTE network when the impact on the GNSS network signals does not meet or exceed a predetermined threshold. In another example, a mitigation strategy may be implemented for a parameter/combination of parameters of an aggressor of the LTE network when the impact on the GNSS network signals meets or exceeds the predetermined threshold. In the above description, some example parameters and combinations of parameters were described. In the remainder of this description when a parameter is described, it should be understood to apply to a specific parameter or a combination of parameters.

In some examples, the mitigation strategy (or scheme) may be to apply a notch filter or a bandpass filter. As those skilled in the art will understand, such a filter may allow select frequencies to pass without any modification or alteration, while one or more other select frequencies pass in a modified state (e.g., attenuated to significantly low levels) or are blocked. With regard to a particular implementation of the GNSS network, the positioning services may utilize a range of frequencies or a number of different frequencies. However, under a given combination of the aggressor of the LTE network when the filter is used, the filter may narrow the range of GNSS signals to be received. For example, the range of frequencies may be narrowed to 1 MHz wide. In some instances, the narrowing of the frequencies of the GNSS network may result in significant decreases in performance. For example, a GNSS network (e.g., Galileo) that operates over a 2 MHz range may effectively be eliminated from implementing a filter that narrows the range to only 1 MHz.

Although the mitigation scheme is an attempt to calibrate for signals received via the GNSS network when the aggressor of the LTE network is present, the mitigation scheme may not be required by or suited to a particular UE. The table of combinations for the aggressor and the corresponding mitigation scheme may be generated based on a worst-case scenario. A UE tested under the worst-case scenario may have experienced a drop in the quality of signals received from the GNSS network in the presence of an aggressor of the LTE network. However, the drop experienced by the UE under test may have been more significant than would be experienced by some other UEs. Thus, the mitigation scheme for a multitude of UEs may have been based on one or more UEs tested, even when the multitude of UEs may have performed better under the same condition(s).

For different UEs, the given parameter/combination of the aggressor of the LTE network may not affect each UE to the same degree, such that the quality of the GNSS network signals would always fall below the predetermined threshold. Accordingly, the worst-case scenario mitigation scheme may be unnecessary for some, or even many, UEs. In some instances, a worst-case scenario for one or more tested UEs may produce a minimal or less severe drop in the quality of the GNSS network signals for a given parameter/combination of an aggressor of the LTE network. Therefore, a mitigation schemes may not have been generated for this parameter/combination. However, a different UE may experience a more significant drop in the quality of the GNSS network signals for this given parameter/combination of the aggressor of the LTE network. Without a suitable mitigation scheme, this UE may not implement a mitigation technique to adjust for this aggressor. Thus, globally applying the worst-case result for an aggressor based on one or more tested UEs may also result in insufficient mitigation schemes for one or more aggressors. Accordingly, a worst-case scenario based mitigation strategy may result in reduced efficiency and/or performance for many UEs.

In view of the captured parameters/combinations (e.g., table) for aggressors of the LTE network that affect the GNSS network signals and the corresponding mitigation strategies being applied in a general manner, e.g., based on worst-case scenarios from testing selected UEs, the disclosed exemplary embodiments provide mechanisms for dynamically calibrating a particular UE so that the proper mitigation is applied, e.g., based on how the UE reacts to the one or more aggressors. The mechanism by which the UE calibrates for aggressors may utilize a performance delta with and without a selected aggressor in predetermined conditions that provide a result with a high probability of reflecting the effect that the aggressor has on the victim network, e.g., the GNSS network. The measurements of the performance delta may be performed until a sufficient confidence in the metric is attained (e.g., a confidence threshold is met). The calibration may be used to tune the performance of the specific UE to yield improved performance over using a worst-case based table derived by testing a relatively small number of UEs.

Figure 2:
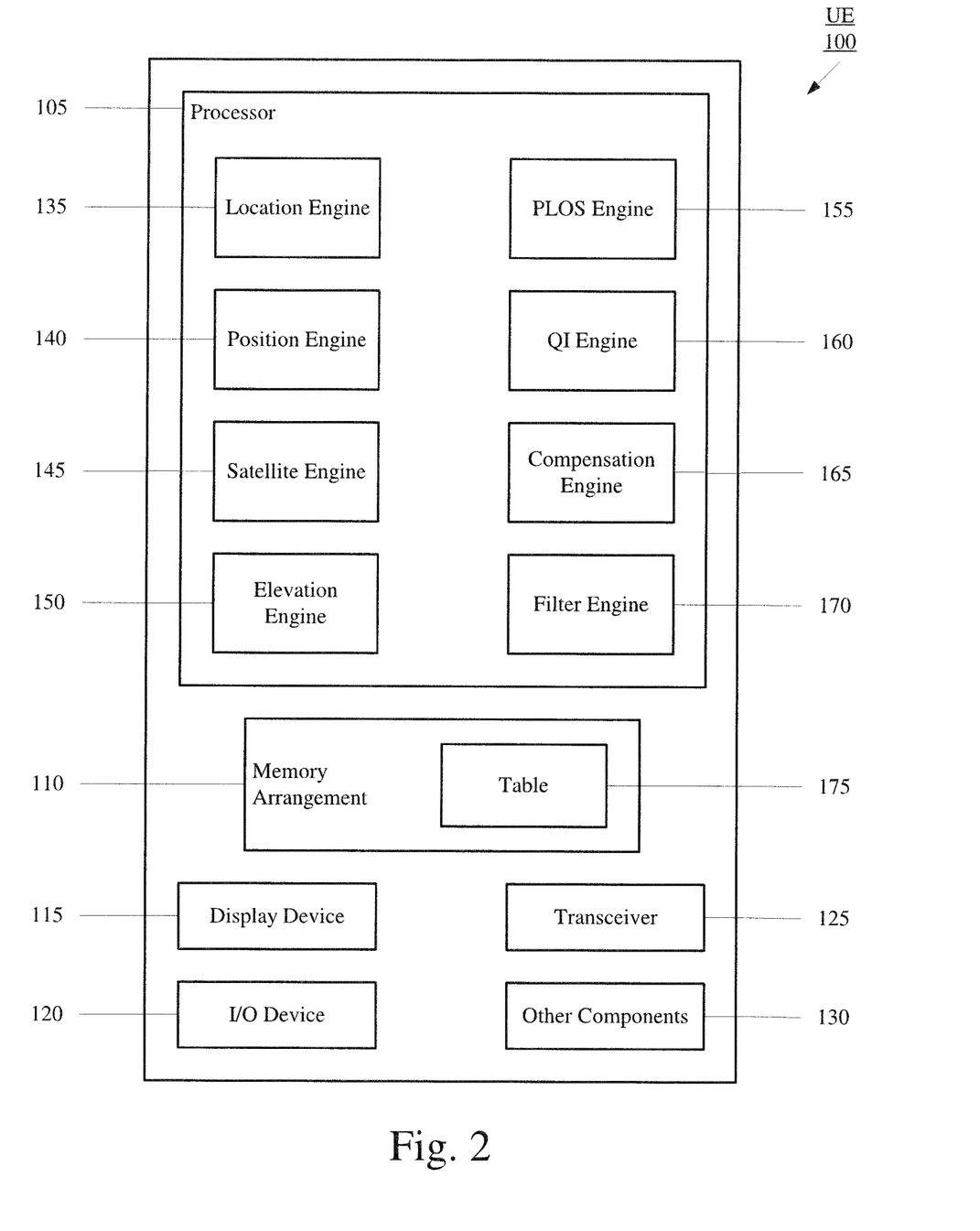
FIG. 2 shows an exemplary user equipment according to various exemplary embodiments described herein.

FIG. 2 shows an exemplary UE 100 according to various exemplary embodiments described herein. The UE 100 may represent any of UEs 30 and 31 and may be any electronic device that is configured to perform wireless functionalities over a plurality of wireless networks. For example, the UE 100 may be a mobile phone, a tablet computer, a smartphone, a phablet, an embedded device, a wearable device, a Cat-M device, a Cat-M1 device, an MTC device, an eMTC device, another type of Internet of Things (IoT) device, etc. The UE 100 is configured to execute a plurality of engines that perform functionalities to calibrate the UE 100 with regard to a victim network, e.g., a GNSS network, based on one or more aggressors, e.g., from an LTE network. The UE 100 may include a processor 105, a memory arrangement 110, a display device 115, an input/output (I/O) device 120, a transceiver 125, and other components 130. The other components 130 may include, for example, one or more sensors to detect movement and movement related data, an audio input device, an audio output device, a battery that provides a power supply, a data acquisition device, ports to electrically connect the UE 100 to other electronic devices, sensors to detect conditions of the UE 100, etc.

As described above, the UE 100 may be configured to receive signals from a GNSS network and establish a connection to an LTE network. Accordingly, the UE 100 may be part of a system or a network arrangement including at least the GNSS network and the LTE network. However, the use of the GNSS network and the LTE network are only exemplary and the exemplary embodiments may be implemented or modified to be used with other types of networks (e.g., legacy networks such as a 3G network, a WCDMA network, a UMTS network, etc., a wireless local area network (WLAN) such as a WiFi network, a short range network such as a Bluetooth™ network, etc.). Thus, the system may also include one or more other types of networks to which the UE 100 may also be configured to establish a connection.

The processor 105 may be configured to execute a plurality of engines of the UE 100. For example, the engines may include a location engine 135, a satellite engine 145, an elevation engine 150, a probability line of sight (PLOS) engine 150, a position engine 155, a quality indicator (QI) engine 160, a compensation engine 165, and a filter engine 170. The location engine 135 may be configured to determine a geographic location of the UE 100 and whether the geographic location is an acceptable location in which to perform the calibration mechanism according to the exemplary embodiments. The position engine 140 may be configured to determine a probability that the geographic location is accurate. The satellite engine 145 may be configured to identify and track available satellites visible at the geographic location. The elevation engine 150 may be configured to determine an elevation mask for each of the identified satellites. The PLOS engine 155 may be configured to determine a line of sight for each of the identified satellites at the geographic location and a probability that the line of sight is true. The QI engine 160 may be configured to determine a relative quality of the overall conditions of the UE 100 to perform the calibration mechanism according to the exemplary embodiments. The compensation engine 165 may be configured to monitor a performance (or value, confidence, etc.) of the GNSS network signals at the UE 100. The filter engine 170 may be configured to determine whether a mitigation scheme is to be used and, if the mitigation scheme is to be used, a type of the mitigation scheme to be implemented for a given aggressor.

Implementation of the engines as applications (e.g., a program) executed by the processor 105 is only exemplary. The functionality associated with an engine may also be represented as a separate incorporated component of the UE 100 or may be a modular component coupled to the UE 100, e.g., an integrated circuit with or without firmware. For example, the integrated circuit may include input circuitry to receive signals and processing circuitry to process the signals and other information. Engines may also be embodied as one combined application, as separate applications, or as part of one or more multifunctional programs. Accordingly, the applications may be implemented in a variety of manners in hardware, software, firmware, or a combination thereof. In addition, in some UEs, the functionality described for the processor 105 is split among two or more processors such as a baseband processor and an applications processor, as will be described in further detail below. The exemplary embodiments may be implemented in any of these or other configurations of a UE.

The memory 110 may be a hardware component configured to store data related to operations performed by the UE 100. As will be described in further detail below, the memory 110 may store a table 175 of parameters (e.g., individual or combinations) for aggressors and corresponding mitigation schemes to be used when applicable. In other implementations, other data structures or organization can be used. The display device 115 may be a hardware component configured to show data to a user while the I/O device 120 may be a hardware component that enables the user to enter inputs. The display device 115 and the I/O device 120 may be separate components or integrated together such as a touchscreen. The transceiver 125 may be a hardware component configured to establish a connection with the GNSS network and the LTE network. Accordingly, the transceiver 125 may be configured with the appropriate chipset that enables these connections to be established on the variety of different frequencies associated with the respective network. With the appropriate chipset for the transceiver 125 to establish an LTE network connection, signals exchanged over the LTE network may be identified and parameters of the signals may be determined. Specifically, with regard to the calibration mechanism according to the exemplary embodiments, the UE 100 may utilize any mechanism(s) to determine one or more parameters, such as the RB and/or the transmitting power of the signal over the LTE network that acts as an aggressor to the GNSS network.

As described above, the UE 100 may be configured to perform a calibration mechanism to calibrate a GNSS network interface when an aggressor from an LTE network is present. The UE 100 may be preloaded with an initial table that is based on a worst-case scenario for aggressors corresponding to the LTE network. The table may be populated by, for example, testing of representative UEs of the same or similar type. For example, upon first activating the UE 100, the table 175 may be the initial table including the preloaded (or default) values. However, although the UE 100 is of the same type as the representative UEs that are tested to generate the initial table, the UE 100 may perform differently to one or more aggressors. This can be true for a variety of reasons (e.g., variations in operating performance of components, margins of difference in size and shape of components, etc.). For example, for a particular aggressor of the LTE network, the UE 100 may not be affected to the same degree as the one or more representative UEs used to generate the worst-case scenario that formed the basis for the mitigation scheme reflected in the initial table. The degree to which the UE 100 differs from the tested UEs may be greater or lesser. For example, when the UE 100 is affected by a first aggressor to a greater degree than the worst-case scenario, the mitigation scheme that is selected for the expected worst-case scenario and indicated in the initial table nonetheless may be insufficient to mitigate the first aggressor for the UE 100. In another example, when the UE 100 is affected by a second aggressor to a lesser degree than the worst-case scenario, the mitigation scheme represented in the table 175 may not be required and/or may be unnecessarily restrictive of an operating performance of the GNSS network in the case of the UE 100. In either scenario, the resulting user experience may be negatively impacted. The exemplary embodiments provide a dynamic calibration mechanism that is used to update the table 175 based on results measured by the UE 100. The calibration may be updated at a variety of times. For example, in some instances the calibration may be continuously updated as the calibration mechanism is performed. In other instances, the calibration may occur when sufficient information has been gathered for the table 175 to be updated.

Figure 3:
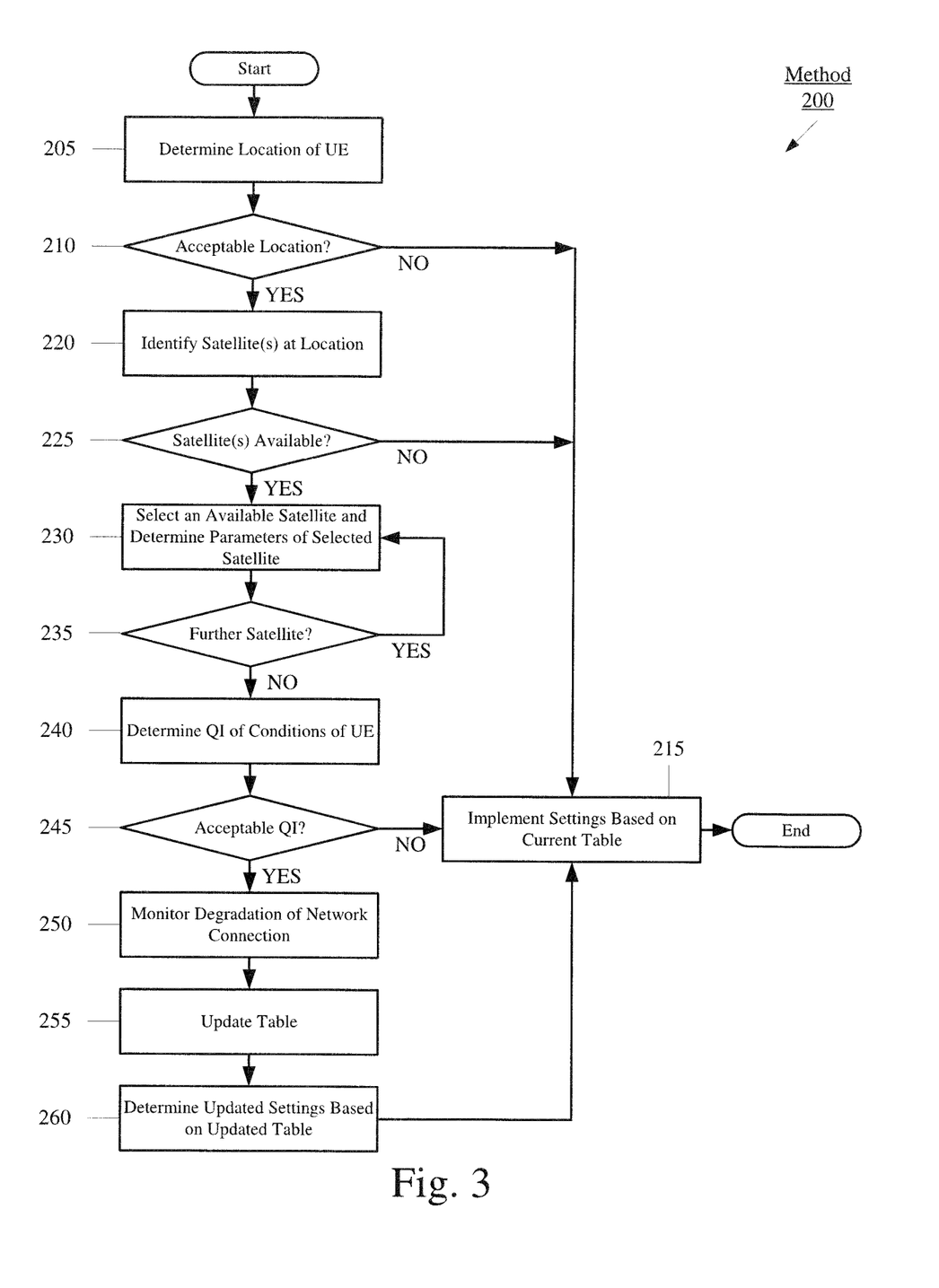
FIG. 3 shows a first exemplary method for determining settings to be used during aggressor signal scenarios according to various exemplary embodiments described herein.

FIG. 3 shows a first exemplary method 200 for determining settings to be used during aggressor signal scenarios according to various exemplary embodiments described herein. The method 200 may relate to the calibration mechanism in which results for individual aggressors of an LTE network are analyzed to tune the UE 100 when utilizing the GNSS network. The method 200 may be performed by any/all of the engines 135-170 and/or other components of the UE 100. The method 200 will be described with regard to the UE 100 of FIG. 2 and the system 1 of FIG. 1, but also may be implemented by other devices.

In 205, the UE 100 determines a geographic location. As described above, the location engine 135 may determine a geographic location of the UE 100. The location engine 135 may determine the geographic location of the UE 100 using any location determining mechanism (e.g., GPS information, triangulation results, etc.). In 210, the UE 100 determines whether the geographic location of the UE 100 is acceptable to perform the calibration mechanism according to the exemplary embodiments. The location engine 135 may further be configured to determine a quality of the geographic location. For example, the quality of the geographic location may be based on whether the location is an acceptable location in which to perform the calibration mechanism according to the exemplary embodiments. As those skilled in the art will appreciate, the urban environment 50 may include various obstacles (e.g., buildings 40 and 41) that may interfere with a signal, e.g., a line of sight interference, reflections, etc. In contrast, the rural environment 60 may not have as many, similar, or any obstacles that interfere with the signal. The interference may be or may include non-aggressor sources of interference. Therefore, the location engine 135 may first determine the geographic location using any location determining mechanism(s) and subsequently determine whether the geographic location is a rural location (e.g., rural environment 60).

The exemplary embodiments may utilize or prefer rural locations for evaluation, e.g., as there is a greater probability that a rural location will provide a "cleaner" signal measurement environment than an urban location. However, the use of one or more rural locations is only exemplary. The location engine 135 may also utilize information from various sources to determine whether the geographic location is acceptable, even if the UE 100 is in an urban location. For example, the UE 100 may be in an open park or field in the urban environment 50 where the signal measurement environment may be substantially similar to a rural location. In another example, the location engine 135 may receive information that indicates that the non-aggressor interference is minimal or less than an interference threshold, such that the geographic location is still acceptable to perform the calibration mechanism according to the exemplary embodiments. Further, the rural environment 60 may include one or more sources of non-aggressor interference (e.g., structures, trees, etc.) that cause the rural location to be unacceptable.

Thus, in 210, a first criteria to determine if the current location is acceptable may be whether the geographic location in which the UE 100 is located corresponds to the rural environment 60 or to the urban environment 50. If the location engine 135 determines that the geographic location corresponds to the rural environment 60, the UE 100 may continue with further processing according to the exemplary embodiments. However, if the location engine 135 determines that the geographic location corresponds to the urban environment 50, the UE 100 may terminate the calibration mechanism according to the exemplary embodiments and proceed to 215 when a current state of the table 175 may be used to implement a mitigation scheme for an identified aggressor. The use of rural and urban environments is only exemplary and further characteristics may be analyzed to determine whether the location of the UE 100 is acceptable or unacceptable to perform the calibration mechanism according to the exemplary embodiments.

In 210, in assessing whether the determined geographic location of the UE is acceptable, the position engine 140 may also be used to determine a probability that the geographic location is accurate (or a confidence value). The calibration mechanism according to the exemplary embodiments may be performed when the accuracy of the geographic location determination is above a predetermined threshold. Thus, the position engine 140 may perform operations related to a probability that the determined location is accurate. The probability of the location determination may be measured based on various mechanisms (e.g., GPS signal quality, confidence of triangulation, number of satellites in view, etc.). With the position probability being measured, for example, from 0 to 1 to indicate whether the determination is accurate, the higher confidence location determinations may have a higher probability whereas the lower confidence location determinations have a lower probability. Accordingly, the first criteria for the location condition may include that the location determination have a probability greater than a predetermined threshold. Therefore, when the location determination satisfies the predetermined threshold, the UE 100 may continue processing. However, if the location determination does not satisfy the predetermined threshold, the UE 100 may terminate the calibration mechanism according to the exemplary embodiments and proceed to 215.

In an exemplary embodiment, the predetermined threshold for the location determination may be 0.5. Thus, the location determination of the UE 100 must be more likely than not accurate to proceed. However, the use of 0.5 is only exemplary and the predetermined threshold may be changed, or a different predetermined threshold may be used for various reasons. For example, in a geographic location having multiple sources from which the location may be determined, the predetermined threshold may be increased since more information is available to verify the location determination.

If the geographic location is of an acceptable type of location and the location determination has at least a predetermined level of accuracy, the UE 100 continues to 220. In 220, the UE 100 identifies available satellites (e.g., visible) at the geographic location. The satellite engine 145 may identify and track available satellites at the geographic location. For the purposes of this example, it may be considered that the UE 30 in the rural environment 60 may identify and track all of the satellites 10-13, but it is not required that the UE track and identify multiple satellites. The exemplary embodiments are described with regard to monitoring a quality of the GNSS network signals. Accordingly, the quality of the GNSS network signals may be based on signals received from one or more satellites (e.g., as broadcast by the satellites 10-13). Thus, an additional criterion that may be considered in determining whether to perform the calibration mechanism according to the exemplary embodiments may be based on the one or more satellites available at the geographic location. An initial operation performed by the satellite engine 145 may be to identify the one or more satellites from which the UE 100 is capable of receiving signals. Therefore, when at least one satellite is identified, the UE 100 may continue processing. In other implementations, multiple satellites, a threshold signal strength, etc. may be required to continue processing. Therefore, in 225, the UE 100 determines whether there are any available satellites. If no satellite is available, the UE 100 continues to 215 and terminates the calibration mechanism.

If at least the threshold number of satellites is identified at the geographic location, the UE 100 continues to 230. In 230, the UE 100 selects an available identified satellite. The UE 100 may then determine one or more parameters associated with the selected satellite. In a first example, the elevation engine 150 may determine a first parameter associated with an elevation of the selected satellite relative to the UE 100 at the geographic location. The elevation engine 150 may determine an elevation mask for each of the identified satellites. As described above, the satellites identified by the satellite engine 145 may have certain characteristics. These characteristics may indicate whether the identified satellites are acceptable for use in the calibration mechanism according to the exemplary embodiments. The elevation mask of a satellite may be a relative angle that the satellite is positioned relative to the UE 100. Specifically, the elevation mask may be measured as an angle from 0° to 90° where 0° indicates that the satellite is positioned such that a line extending from the UE 100 to the satellite passes through a point on the horizon at the geographic location and 90° indicates that the satellite is directly above the UE 100. Those skilled in the art will understand that a satellite at an elevation of 90° may provide a cleaner signal than a satellite closer to the horizon with an elevation of 0°. For example, the terrain of the geographic location may cause the line of sight of a satellite with a low elevation to be obstructed by the terrain. In another example, the UE 100 having a first planetary rotational speed and the satellite having a second rotational speed at its orbital location may cause Doppler issues. When a satellite is directly overhead, these Doppler issues may be significantly reduced. Accordingly, the second criteria for the parameters of the satellite may include that the elevation of an identified satellite be at or above an elevation threshold. Therefore, when at least one identified satellite has an elevation that satisfies the elevation threshold, the UE 100 may continue processing. However, if there are no identified satellites that satisfy the elevation threshold, the UE 100 may terminate the calibration mechanism according to the exemplary embodiments.

In some embodiments, the elevation threshold may be a 50°. However, an elevation of 50° is only exemplary and the elevation threshold may be set at any desired elevation. For example, in a relatively flat geographic location with little to no non-aggressor interference sources, the elevation threshold may be decreased since lower satellites relative to the UE 100 may still provide acceptable performance. In another example, in a relatively uneven geographic location with non-aggressor interference sources, the elevation threshold may be increased, since there is a greater chance that the signal pathway of one or more satellites may be impeded. Thus, in the example of system 1, it may be considered that the elevation of satellites 11-13 are above the predetermined elevation threshold with respect to the UE 30, while the satellite 10 is below the predetermined elevation threshold. Thus, for purposes of the exemplary method 200, the satellite 10 may be excluded from further consideration.

In a second example of determining parameters of a selected satellite in 230, the PLOS engine 155 may determine a line of sight for one or more of the identified satellites at the geographic location and a probability that the line of sight is true (or accurate). Again, the PLOS may relate to a characteristic of the identified satellites with regard to the second criteria and the parameters of the identified satellites being acceptable to perform the calibration mechanism according to the exemplary embodiments. The PLOS may be measured as a probability from 0 to 1 that indicates that the line of sight between an identified satellite and the UE 100 is direct. In other implementations, other scales and/or values can be used. Those skilled in the art will understand that a signal may reach the UE 100 from the satellite in a variety of pathways. For example, a signal may follow a direct pathway from the satellite to the UE 100 through the air. In other examples, e.g., in an urban environment, the signal may reflect off of one or more buildings and/or other surfaces to eventually (indirectly) reach the UE 100. With proper measurements and analyses, the pathway taken by a signal from the satellite to reach the UE 100 may be used to determine the PLOS where a direct pathway has a higher PLOS and an indirect pathway (e.g., via reflections) has a lower PLOS. Accordingly, the criteria for the parameters of the satellite may include that the PLOS of an identified satellite be above a predetermined PLOS threshold. Therefore, when at least one identified satellite has a PLOS that satisfies the predetermined PLOS threshold, the UE 100 may continue processing. However, if there are no identified satellites having a PLOS that satisfies the predetermined PLOS threshold, the UE 100 may terminate the calibration mechanism according to the exemplary embodiments.

In an exemplary embodiment, the predetermined PLOS threshold may be 0.5. Thus, in order to proceed, the PLOS of the identified satellite must be more likely than not direct. However, the use of 0.5 is only exemplary and the predetermined PLOS threshold may be changed for various reasons. For example, in a relatively flat geographic location with little to no non-aggressor interference sources, the PLOS predetermined threshold may be increased since fewer sources may require a higher standard for a direct line of sight. In the example of system 1, it may be considered that the PLOS threshold of satellites 11-12 are above the predetermined PLOS threshold with respect to the UE 30, while the satellite 13 is below the predetermined PLOS threshold because the line of sight is being blocked by an obstruction (e.g., a tree). Thus, for purposes of the exemplary method 200, the satellite 13 may be excluded from further consideration.

Returning to 230, after determining the parameters of the selected satellite, the UE 100 continues to 235 where a determination is made whether one or more further satellites are available. If a further satellite is available, the UE 100 returns to 230 to analyze this further satellite. If no further satellites are available, the UE 100 continues to 240.

In 240, the UE 100 determines a QI of the conditions of the UE 100. The QI engine 160 may determine a relative quality of the overall conditions of the UE 100 to perform the calibration mechanism according to the exemplary embodiments. Specifically, the QI engine 160 may consider the outputs of any/all of the location engine 135, the position engine 140, the satellite engine 145, the elevation engine 150, and the PLOS engine 155. The QI engine 160 may determine a QI value based on any combination of characteristics of the conditions of the UE 100. For example, the characteristics may include the determined accuracy of the geographic location (e.g., above the predetermined position threshold), the identified elevation of the satellite(s) (e.g., an elevation above the elevation threshold), and/or that the PLOS of the identified satellite(s) (e.g., a PLOS above the predetermined PLOS threshold). Thus, the QI value may indicate whether the GNSS network signals are reliable for use in the calibration mechanism according to the exemplary embodiments. Again, since the calibration mechanism is used to set one or more values in the table 175 and to determine one or more mitigation schemes that are to be used, the quality of the GNSS network signals should be sufficient for such a functionality. Thus, the QI engine 160 may determine whether the calibration mechanism according to the exemplary embodiments is to be performed. Each output of the location engine 135, the position engine 140, the satellite engine 145, the elevation engine 150, and the PLOS engine 155 may provide input as to whether the calibration mechanism is to be performed. The QI engine 160 may perform this determination based on an overall review of the conditions of the UE 100. Using a QI threshold that defines a minimum standard on which to allow use of the calibration mechanism, the QI engine 160 may incorporate the parameters of the satellites with the information of the location to determine whether the conditions of the UE 100 are acceptable to perform the calibration mechanism. The output of the QI engine 160 may indicate which of the identified satellites are to be used in the calibration mechanism. The output of the QI engine 160 also may indicate which available satellites are to be omitted. Thus, the calibration mechanism may utilize satellites that satisfy a standard to update the table 175.

Returning to the method 200, after determining the QI of the UE 100, in 245, the UE 100 determines whether the QI is acceptable. If the QI is not acceptable (e.g., below the QI threshold), the UE 100 continues to 215 where the calibration mechanism is terminated. However, if the QI is acceptable (e.g., above the QI threshold), the UE 100 performs the calibration mechanism.

In 250, the UE 100 monitors a degradation of the signals received from the GNSS network while an aggressor is present. The compensation engine 165 may monitor one or more performance values of the GNSS network signals received by the UE 100. Initially, the calibration mechanism according to the exemplary embodiments determines a degradation in the quality of the GNSS network signals. Therefore, the degradation is based on a reference quality. The reference quality may be a performance of the GNSS network when an aggressor is being tested (e.g., at a specified combination of RB and transmit power) or when all aggressors are absent. The reference quality may be measured, e.g., based on a dB value. Accordingly, at some time, the compensation engine 165 may monitor the GNSS network signals absent the aggressor and determine the quality in dB. In one example, the compensation engine 165 may perform this reference quality measurement prior to use of the calibration mechanism according to the exemplary embodiments.

When the QI engine 160 indicates that the conditions of the UE 100 are proper to perform the calibration mechanism according to the exemplary embodiments, the compensation engine 165 may monitor degradation of the GNSS network signals while a specified aggressor (e.g., at a specific combination of RB and transmit power) is present. For example, the compensation engine 165 may monitor the degradation as a carrier to noise density ratio (C/N0) for the identified satellites to be used. The degradation may therefore be measured as a loss in dB relative to the reference quality. The GNSS network signals may be monitored for the degradation without any mitigation scheme being implemented.

The compensation engine 165 may also be configured to determine when the degradation results of the GNSS network signals in the presence of a specified aggressor have reached a predetermined confidence threshold. As any one degradation result may not be illustrative of how the UE 100 reacts to an aggressor, the compensation engine 165 may determine a plurality of degradation results. The degradation results may be determined until an associated confidence value reaches a confidence threshold. Once the confidence threshold has been reached, the table 175 may be updated to indicate the resulting degradation to the GNSS network signals in the presence of the specified aggressor.

The compensation engine 165 may perform the above-described operation of monitoring the GNSS network signals in the presence and in the absence of one or more aggressors. Thus, returning to the method 200, based on the result for the aggressor of the LTE network, in 255, the UE 100 updates the table 175. In this manner, one or more default entries in the table 175 may be updated from the initial table that was preloaded when the UE 100 was deployed. The table 175 may be updated dynamically for each aggressor and parameter or combination of parameters (e.g., RB and transmit power) so that a resulting degradation experienced by the UE 100 having a sufficient confidence may be recorded in the table 175. Other measurements of the resulting degradation that have not met the confidence threshold may be stored so that subsequent degradation measurements for a given aggressor may be used in building a confidence score for this aggressor until the confidence threshold is met for the entry in the table 175 to be updated.

In 260, the UE 100 may determine updated settings based on the updated table 175. The filter engine 170 may determine whether a mitigation scheme is to be used to calibrate, or otherwise modify, the GNSS network interface and, if the mitigation scheme is to be used, a type of the mitigation scheme to be implemented for a given aggressor. Upon initial deployment of the UE 100, the table 175 may be an initial table with a default entry for each of a number of aggressors (e.g., given a combination of RB and transmit power on the LTE network). The table 175 also may include the resulting degradation that is experienced as a worst-case by one or more UEs used for testing. Based on the resulting degradation, a mitigation scheme may also be indicated if the degradation warrants use of the mitigation scheme (e.g., the quality of the GNSS network signals fall below a predetermined threshold). When the table 175 is updated, the filter engine 170 may determine whether the mitigation scheme associated with an updated entry of the table 175 requires further updating. For example, the mitigation scheme may be a filter that is applied to the GNSS network interface, e.g., for a select range of frequencies to be used while a given aggressor is present. Based on the table 175, the filter engine 170 may determine whether a filter is to be implemented for a given aggressor and the type of filter to be used or whether an already indicated filter in the table 175 is to be modified or removed. In this manner, the calibration mechanism according to the exemplary embodiments may tune performance of the GNSS network interface specifically for the UE 100, even as conditions change. Thus, in proceeding from 260 to 215, the UE 100 may implement the updated settings as reflected in the updated table 175.

The above described calibration mechanisms may be used for individual aggressors. The entries in the table 175 for a respective given aggressor may require varying amounts of time to have enough results for a combined confidence to be greater than the confidence threshold. For example, assuming the conditions of the UE 100 are sufficient to perform the calibration mechanism, a first aggressor may arise frequently, and a sufficient number of results may be observed for the confidence threshold to be satisfied. In another example, again assuming the conditions of the UE 100 are sufficient to perform the calibration mechanism, a second aggressor may arise less frequently such that a relatively long time and/or number of sessions must be observed for the confidence threshold to be satisfied. If an entry in the table 175 is not updated over a threshold amount of time, the calibration mechanism may utilize a biasing calibration mechanism.

The biasing calibration mechanism may enable the updating of one or more entries for corresponding aggressors in the table 175, based on results specific to the UE 100. The one or more entries updated using the biasing mechanism can be retained as a temporary substitute, e.g., for the corresponding default values, until sufficient results have been generated for the aggressor to satisfy the confidence threshold. However, the biasing calibration mechanism being described as providing a substitute entry is only exemplary. The biasing calibration mechanism may also be used in an individual capacity to update the table 175 without any further updating.

The biasing calibration mechanism may provide an opportunity for a 1-point calibration. As those skilled in the art will understand, control bits in the LTE network may be transmitted at extreme RBs. For example, the RB49 may be used as a control RB to transmit control bits from the LTE network to the UE 100. Furthermore, the RB49 may be used relatively early in establishing the LTE network connection such that results from the aggressor having the RB49 may be generated in this earlier time frame. In addition, control bits are transmitted relatively frequently, which reduces a ramping requirement used for other combinations of RB and transmit power. Therefore, the results of an aggressor having the RB49 may be determined and have a confidence that satisfies the confidence threshold relatively early when establishing the LTE connection. The exemplary embodiments for the biasing calibration mechanism are described with regard to RB49. However, the use of RB49 is only exemplary and any aggressor of the LTE network may be used as the basis for using the biasing calibration mechanism.

The biasing calibration mechanism may also utilize the standard on which the above described calibration mechanism is determined to be performed. For example, the biasing calibration mechanism may also utilize the QI of the QI engine 160 to determine whether the biasing calibration mechanism is to be used. Thus, any/all of the location output of the location engine 135, the position accuracy output of the position engine 140, the identified satellite output of the satellite engine 145, the elevation output of the elevation engine 150, and the PLOS output of the PLOS engine 155 may be used in determining whether the biasing calibration mechanism is to be used. For example, the determination as to whether and when to use the biasing calibration mechanism can be performed in a substantially similar manner as the calibration mechanism.

When the conditions of the UE 100 are proper for performing the biasing calibration mechanism, the compensation engine 165 may perform the biasing calibration mechanism. For example, the biasing calibration mechanism can be used when control data over the RB49 is detected and the degradation related to the aggressor for the RB49 can be measured in a substantially similar manner as for the calibration mechanism. For example, a reference quality of signals received from the GNSS network may be determined and a degradation of this reference quality (e.g., measured in loss of dB) in the presence of the aggressor for the RB49 may be determined. The calibration mechanism may be used to update the table 175 for the aggressor having the RB49 in the manner described above. The biasing calibration mechanism may also be used once the degradation result from the aggressor having the RB49 has reached a confidence value satisfying the confidence threshold.

Using the degradation result of the aggressor having the RB49, the compensation engine 165 may perform the biasing calibration mechanism with respect to one or more entries of the table 175, e.g., that have not been updated based on results specific to the UE 100. For example, the table 175 may have an entry for an aggressor based on the initial table. The results specific to the UE 100 for this aggressor may yet to be determined or may not have a corresponding confidence value that satisfies the confidence threshold. For such a further entry in the table 175, the biasing calibration mechanism may be used.

The biasing calibration mechanism may be used for entries in the table 175 by biasing the degradation result for the aggressor having the RB49 to other entries in the table 175 for aggressors having different RBs. For example, a different RB may have a difference in parameters (e.g., frequency) relative to the RB49. The compensation engine 165 may utilize any/all such differences in parameters and the degradation result of the aggressor having the RB49 to generate values for other aggressors having a different RB, compensating for the respective difference(s). The aggressor may have a combination of parameters such as RB and transmit power. The biasing calibration mechanism may also incorporate the transmit power to bias the degradation result to other aggressors. For example, for one or more different transmit powers, there may be respective degradation results for each aggressor having the RB49. However, the results for a particular aggressor may be used to bias other aggressors in the table 175 by applying the bias for the RB49 at a selected transmit power to another aggressor having a different RB at the same selected transmit power. However, the biasing calibration mechanism may also be configured to bias the degradation result of the RB49 to account for any different in RB and transmit power.

Using the above described biasing calibration mechanism, the table 175 may be updated such that respective mitigation schemes (when applicable) may be determined for use when the corresponding aggressor is present. In this manner, the biasing calibration mechanism according to the exemplary embodiments may tune performance of the GNSS network signals specifically for the UE 100 based on a particular aggressor that is more likely to have a degradation result with a confidence greater than the confidence threshold.

Figure 4:
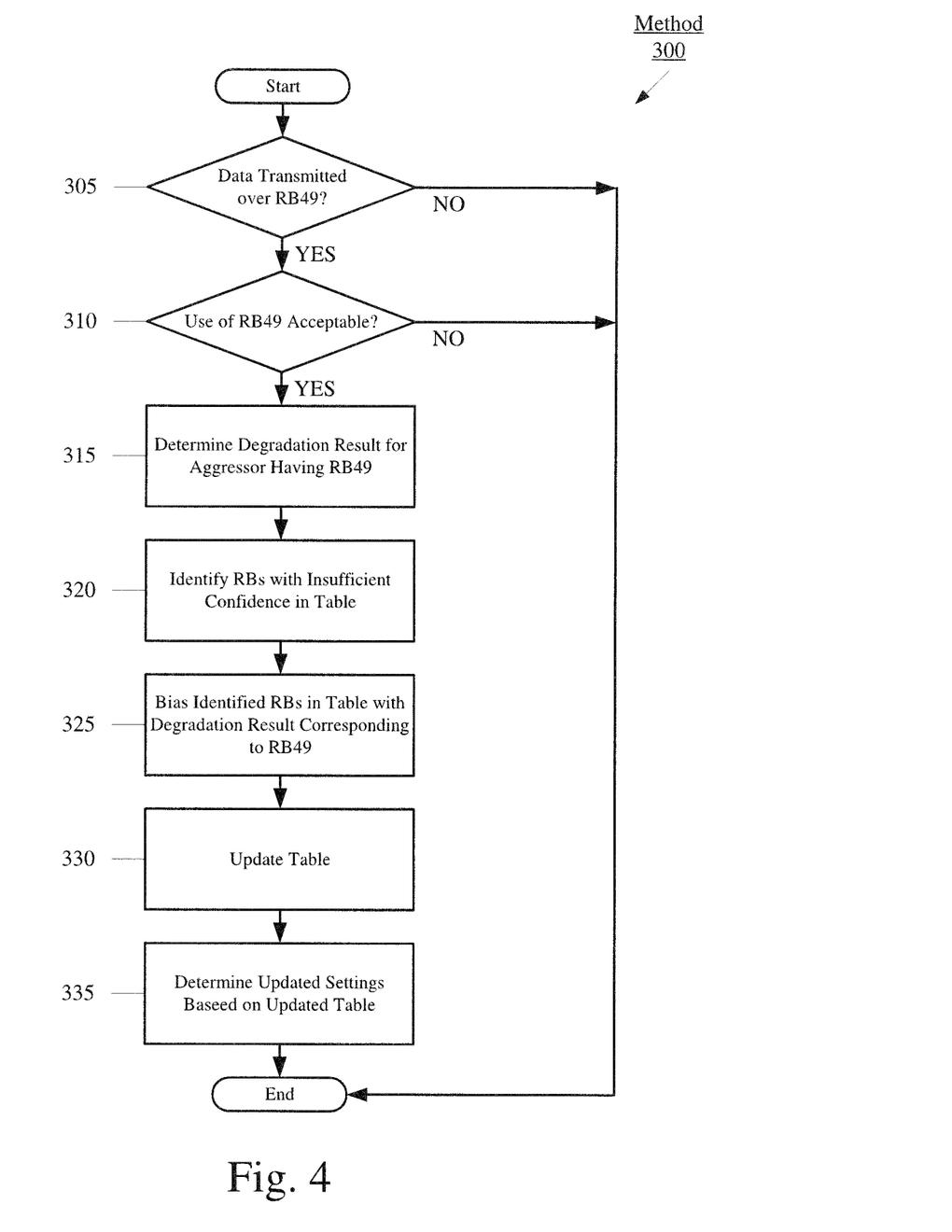
FIG. 4 shows a second exemplary method for determining settings to be used during aggressor signal scenarios according to various exemplary embodiments described herein.

FIG. 4 shows a second exemplary method 300 for determining settings to be used during aggressor signal scenarios according to various exemplary embodiments described herein. The method 300 may relate to the biasing calibration mechanism in which results for a particular aggressor of an LTE network having a specified combination of parameters is analyzed to bias other aggressors so that the UE 100 is tuned in utilizing the GNSS network. The method 300 may be performed by the engines 135-170 and/or other components of the UE 100. The method 300 will be described with regard to the UE 100 of FIG. 2.

In 305, the UE 100 determines whether data is being transmitted on the LTE network, e.g., over RB49. For example, control data may be transmitted over the edge RB49. When the RB49 is used (e.g., particularly over the LTE band 13), the degradation related to the aggressor having the RB49 may be monitored, e.g., for use with the biasing calibration mechanism. If data is not being transmitted over RB49, the biasing calibration mechanism may be terminated. However, the use of RB49 is only exemplary and other RBs or characteristic of the LTE network may be used to reduce a ramp up in gathering degradation results to meet a confidence threshold.

In 310, the UE 100 determines whether use of the RB49 results to update the table 175 is acceptable. For example, the UE 100 may determine whether the conditions of the UE 100 are acceptable for update the table 175 in light of degradation results associated with the aggressor, e.g., having the RB49. Accordingly, a QI for the conditions of the UE 100 may be determined in a manner substantially similar to the calibration mechanism described above with regard to the method 200 of FIG. 3. When the use of the RB49 is unacceptable, the biasing calibration mechanism may be terminated.

When the use of the RB49 is acceptable for updating the table 175, the UE 100 continues to 315 where the UE 100 determines a degradation result associated with the aggressor having the RB49. For example, a loss of quality (e.g., as measured in dB) may be measured relative to a reference quality without the aggressor having the RB49. The table 175 may be updated based at least in part on the determined degradation.

In 320, the UE 100 identifies one or more entries in the table 175 associated with one or more aggressors that have not been updated based on degradation results experienced by the UE 100. For example, the entries may correspond to the initial (or default) degradation results from the initial table, such as entries for which there has been no confirmation or updating based on degradation results experienced by the UE 100, and/or for which degradation results experienced by the UE 100 have not reached a confidence value that satisfies a confidence threshold.

In 325, the UE 100 biases one or more of the identified aggressors in the table 175 based at least in part on the degradation resulting from the aggressor having the RB49. As described above, the biasing operation may be performed using a variety of factors to compensate for differences in one or more characteristics of the aggressors. For example, a first aggressor may have an RB other than RB49. Thus, the degradation estimated to be caused by the first aggressor may be adjusted to account for the difference in frequency. In another example, a second aggressor may have a different transmit power than the aggressor having the RB49. Thus, the difference in power may be accounted for in determining how to bias the degradation estimated to be caused by the second aggressor.

In 330, the UE 100 updates the table 175 based on the biasing operation for the one or more identified entries. In 335, the UE 100 determines updated settings for the one or more entries that have been updated in the table 175. For example, a mitigation scheme based on the worst-case scenario may be modified or removed when the corresponding entry in the table 175 is updated to reflect a low degree of degradation. In another example, it may be determined that a mitigation scheme is necessary after an entry in the table 175 is updated, e.g., when a higher degree of degradation is expected. In a further example, the type of mitigation scheme to be implemented may be determined based on the biased degradation result for the updated entry.

The exemplary embodiments provide a device, system, and method of tuning a UE for traffic on a first network by calibrating for one or more aggressors from a second network. One or more default values, e.g., generated based on testing one or more representative devices using a worst expected case scenario, may be updated after determining that the conditions of the UE are acceptable to perform device specific calibration. In some implementations, the conditions can include location-based and/or satellite-based conditions, e.g., when the first network includes one or more satellites. The UE may monitor a degradation associated with the first network interface, e.g., a GNSS interface, caused by an aggressor associated with a second network, e.g., an LTE network. Further, one or more parameters associated with the aggressor may be observed and/or determined. By updating a table to reflect the actual degradation caused by one or more aggressors having unique combinations of parameters, the UE may be tuned based on its own performance in the presence of the aggressors rather than expected degradation based on testing, e.g., of representative devices. The exemplary embodiments may also utilize a biasing calibration mechanism (e.g., a 1-point biasing calibration mechanism) that can utilize a degradation result associated with a selected aggressor that quickly satisfies a confidence threshold to estimate the degradation expected to be caused by one or more other aggressors that satisfy the confidence threshold more slowly.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
at a device configured to receive signals from a first network and one of transmit signals to or receive signals from a second network:
determining whether at least one parameter related to the first network satisfies a predetermined condition;
when the at least one parameter satisfies the predetermined condition, monitoring a degradation of signals received from the first network when an aggressor of the second network is present relative to signals received from the first network when the aggressor is absent;
determining a setting to subsequently utilize the first network when the aggressor is present based, at least in part, on the degradation; and
wherein the at least one parameter comprises a location criteria of the device, the location criteria associated with a location of the device, the location criteria comprising one of a type of the location, a position certainty of the location, or a combination thereof.

2. The method of claim 1, wherein the predetermined condition for the location criteria comprises the type of the location being a rural location, the position certainty being a probability of being accurate that is at least a predetermined threshold, or a combination thereof.

3. The method of claim 1, wherein the at least one parameter comprises a quality criteria of the device, the quality criteria associated with the first network, the quality criteria comprising one of an elevation of a component of the first network, a probability line of sight (PLOS) of the component, or a combination thereof.

4. The method of claim 3, wherein the predetermined condition for the quality criteria is the elevation being at least 50°, the PLOS being at least a predetermined threshold, or a combination thereof.

5. The method of claim 1, wherein the setting has an initial setting based on an initial degradation, the initial degradation being based on a worst-case scenario from lab testing using the aggressor with a different device of a same or similar type as the device.

6. The method of claim 1, wherein the degradation of the signals when the aggressor is present is based on a plurality of degradation results that have a confidence satisfying a confidence threshold.

7. The method of claim 6, further comprising:
monitoring a further degradation of the signals received from the first network when a further aggressor of the second network is present relative to signals received from the first network when the further aggressor is absent;
when the confidence of the degradation results does not satisfy the confidence threshold, determining a temporary setting to subsequently utilize the first network when the aggressor is present using a bias based on the further degradation.

8. The method of claim 1, wherein the aggressor comprises a characteristic including a resource block identity, a transmit power, or a combination thereof.

9. The method of claim 1, wherein the setting comprises a filter setting to be applied to signals received from the first network.

10. The method of claim 1, wherein the first network is a satellite based network and the second network is a Long Term Evolution (LTE) network.

11. A device, comprising:
a transceiver configured to receive signals from a first network and one of receive signals from or transmit signals to a second network;
a processor configured to determine whether at least one parameter related to the first network satisfies a predetermined condition, when the at least one parameter satisfies the predetermined condition, the processor monitoring a degradation of signals received from the first network when an aggressor of the second network is present relative to signals received from the first network when the aggressor is absent, the processor further configured to determine a setting to subsequently utilize the first network when the aggressor is present based, at least in part, on the degradation; and
wherein the at least one parameter comprises a location criteria of the device, the location criteria associated with a location of the device, the location criteria comprising one of a type of the location, a position certainty of the location, or a combination thereof.

12. The device of claim 11, further comprising:
a memory storing an initial table comprising the aggressor, an initial degradation, and an initial setting,
wherein the initial degradation is based on a worst-case scenario from lab testing using the aggressor with a different device of a same or similar type as the device, the initial setting being based on the initial degradation.

13. The device of claim 11, wherein the processor updates the initial table for the aggressor by updating the initial degradation with the monitored degradation and updating the initial setting with the determined setting.

14. The device of claim 11, wherein the at least one parameter comprises a quality criteria of the device, the quality criteria associated with the first network, the quality criteria comprising one of an elevation of a component of the first network, a probability line of sight (PLOS) of the component, or a combination thereof.

15. The device of claim 11, wherein the aggressor comprises a characteristic including a resource block identity, a transmit power, and a combination thereof.

16. The device of claim 11, wherein the setting comprises a filter setting to be applied to signals received from the first network.

17. The device of claim 11, wherein the first network is a satellite based network and the second network is a Long Term Evolution (LTE) network.

18. A method, comprising:
at a device configured to receive signals from a first network and one of transmit signals to or receive signals from a second network:
determining whether at least one parameter related to the first network satisfies a predetermined condition;
when the at least one parameter satisfies the predetermined condition, monitoring a first degradation of signals received from the first network when a first aggressor of the second network is present relative to signals received from the first network when the first aggressor is absent; and
determining a setting to subsequently utilize the first network when a second aggressor is present using a bias based on the first degradation that is applied to a second degradation of the second aggressor.

19. The method of claim 18, further comprising:
applying a filter setting to signals received from the first network.

20. The method of claim 18, wherein:
the first network is a satellite based network and the second network is a Long Term Evolution (LTE) network.

* * * * *